(12) United States Patent
Zhuk

(10) Patent No.: US 8,863,234 B2
(45) Date of Patent: Oct. 14, 2014

(54) COLLABORATIVE SECURITY AND DECISION MAKING IN A SERVICE-ORIENTED ENVIRONMENT

(75) Inventor: Yefim Zhuk, Englewood, CO (US)

(73) Assignee: The Boeing Company, Chicago, IL (US)

( * ) Notice: Subject to any disclaimer, the term of this patent is extended or adjusted under 35 U.S.C. 154(b) by 1095 days.

(21) Appl. No.: 12/186,925

(22) Filed: Aug. 6, 2008

(65) Prior Publication Data

US 2010/0037058 A1 Feb. 11, 2010

(51) Int. Cl.
| | | |
|---|---|---|
| *H04L 29/06* | (2006.01) | |
| *G06Q 10/06* | (2012.01) | |
| *G06F 21/33* | (2013.01) | |
| *H04L 12/24* | (2006.01) | |

(52) U.S. Cl.
CPC ....... *H04L 63/0807* (2013.01); *H04L 2463/121* (2013.01); *G06F 2221/2151* (2013.01); *G06Q 10/06* (2013.01); *G06F 21/335* (2013.01); *H04L 41/5054* (2013.01); *H04L 41/5009* (2013.01)
USPC ...... 726/3; 713/176; 726/6; 726/23; 709/206; 709/213

(58) Field of Classification Search
USPC .............. 713/176; 726/3, 6, 23; 709/206, 213
See application file for complete search history.

(56) References Cited

U.S. PATENT DOCUMENTS

| | | | |
|---|---|---|---|
| 7,200,860 B2 | | 4/2007 | Ghaffar |
| 7,299,492 B2 | | 11/2007 | Thrash et al. |
| 7,493,528 B1 | * | 2/2009 | Reichert et al. ................ 714/48 |
| 7,529,738 B2 | * | 5/2009 | Christiance et al. .......... 707/687 |
| 7,587,404 B1 | * | 9/2009 | Albertelli, Jr. ........................ 1/1 |
| 7,725,570 B1 | * | 5/2010 | Lewis ............................ 709/224 |
| 7,757,268 B2 | * | 7/2010 | Gupta et al. ...................... 726/1 |
| 7,890,928 B2 | * | 2/2011 | Patrudu ......................... 717/114 |
| 8,091,114 B2 | * | 1/2012 | Lommock et al. ................. 726/1 |
| 2003/0065777 A1 | | 4/2003 | Mattila et al. |
| 2006/0139587 A1 | * | 6/2006 | Rossing et al. ................. 355/53 |
| 2007/0195806 A1 | * | 8/2007 | Tomsu et al. .................. 370/401 |
| 2007/0198432 A1 | * | 8/2007 | Pitroda et al. ................... 705/64 |
| 2008/0056500 A1 | * | 3/2008 | Bradley et al. ................ 380/279 |
| 2008/0066165 A1 | * | 3/2008 | Rosenoer .......................... 726/5 |
| 2009/0132708 A1 | * | 5/2009 | Hayward ...................... 709/226 |
| 2010/0235879 A1 | * | 9/2010 | Burnside et al. .................. 726/1 |

FOREIGN PATENT DOCUMENTS

| | | |
|---|---|---|
| EP | 1271882 A2 | 1/2003 |
| EP | 1496664 A2 | 1/2005 |
| EP | 1912413 A1 | 4/2008 |
| WO | WO 02/13016 A1 | 2/2002 |

OTHER PUBLICATIONS

Extended European Search Report dated Sep. 29, 2010 Application No. 09251516.2-2212 / 2154638.

(Continued)

*Primary Examiner* — Mohammad A Siddiqi

(57) ABSTRACT

A method of providing collaborative security and collaborative decision making in a service-oriented environment. The method includes validating request(s) by application(s) for service(s) in the environment, and providing each service for which an application request is validated. The method also includes monitoring a situational state exposed by services being provided in the environment. Based on the monitored state, the validating of one or more service requests is influenced.

20 Claims, 9 Drawing Sheets

(56) References Cited

OTHER PUBLICATIONS

"Windows 2000 Kerberos Authentication" Windows 2000 Kerberos Authentication White Paper, Jul. 1, 1999, pp. 1-46, XP002291163 (as referred to in Extended European Search Report dated Sep. 29, 2010—Application No. 09251516.2).

Popular security gateway solutions: DataPower, IBM, XS40 XML Security Gateway: Secure XML & Web Services; www-306.ibm.com/software/integration/datapower/xs40/.

* cited by examiner

COLLABORATIVE SECURITY AND DECISION MAKING IN A SERVICE-ORIENTED ENVIRONMENT

FIELD

The present disclosure relates generally to networks and more particularly (but not exclusively) to providing security and collaborative decision making for a plurality of services in a service-oriented environment.

BACKGROUND

The statements in this section merely provide background information related to the present disclosure and may not constitute prior art.

In a service-oriented environment, various functionalities and resources may be provided as distinct, reusable services which are made available to various applications in the network. An application can use and reuse a service instead of having to include within its own code the functionality provided by the service. Services exposed in a network, however, might be invoked not only by legitimate applications but also by hackers.

SUMMARY

The present disclosure, in one implementation, is directed to a method of providing collaborative security and collaborative decision making in a service-oriented environment. The method includes validating request(s) by application(s) for service(s) in the environment, and providing each service for which an application request is validated. The method also includes monitoring a situational state exposed by services being provided in the environment. Based on the monitored state, the validating of one or more service requests is influenced.

In another implementation, the disclosure is directed to a method of providing collaborative security and decision making as to a plurality of services for one or more applications in a service-oriented architecture (SOA) environment. The method is performed by at least one instance of a collaborative security and decision making system. An application ticket is issued to an application invoked by a user of the environment. In response to a request by the invoked application for one of the services, the application ticket is validated and the requested service is provided to the application. The method includes monitoring a situational state exposed by the provided service and by other services being provided in the environment, and updating the application ticket in response to another service request by the invoked application. The updating is performed based on the situational state and a lifecycle of the invoked application.

In yet another implementation, the disclosure is directed to a system for providing collaborative security and decision making in connection with a plurality of services for a plurality of applications. The system includes at least one processor and memory configured to validate request(s) by application(s) for service(s) in the environment and to provide each service for which an application request is validated. The at least one processor and memory are configured to monitor a situational state exposed by services being provided in the environment, and based on the monitored state, to influence the validating of one or more service requests.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
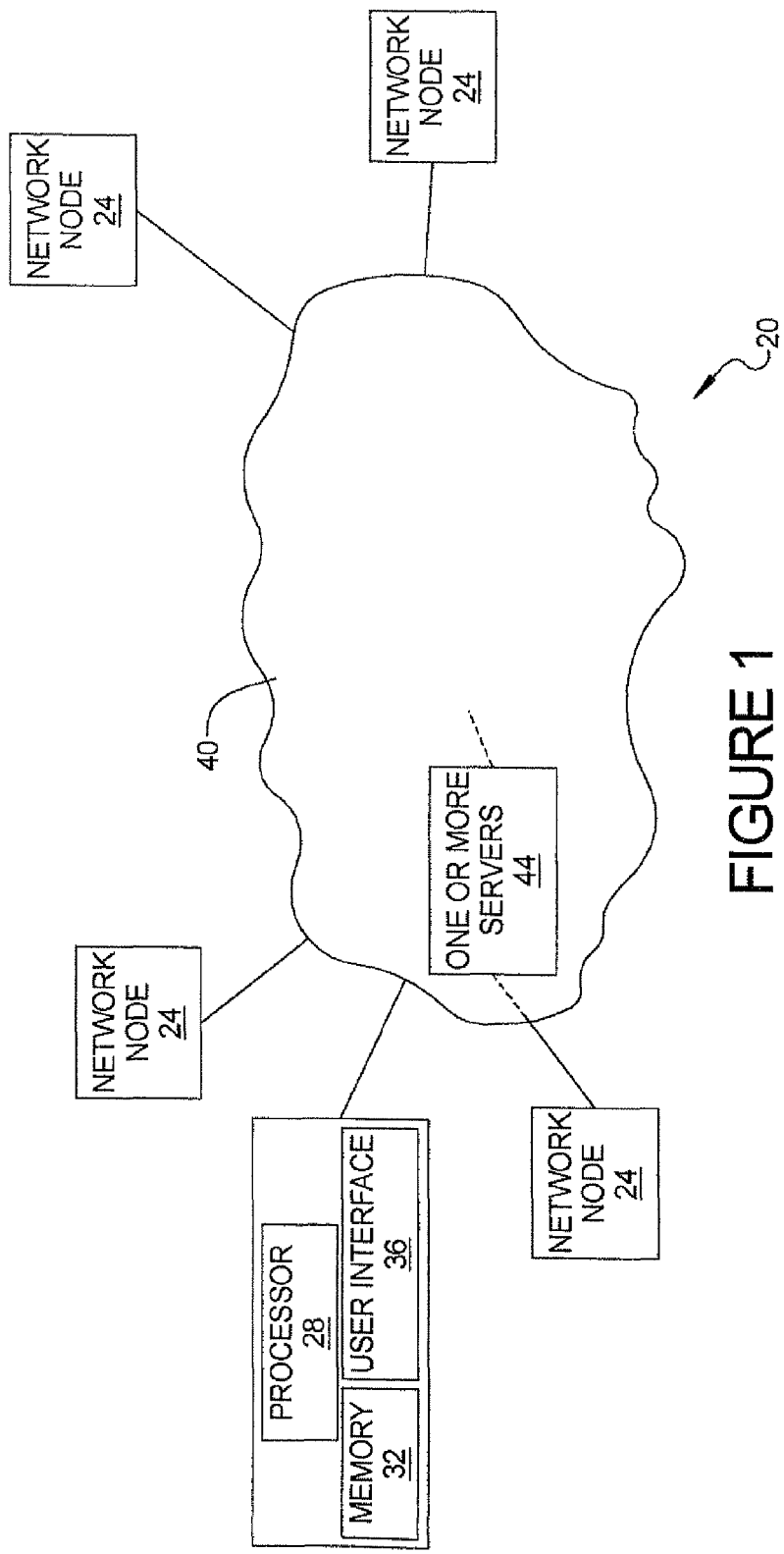
FIG. 1 is a diagram of a net-centric, service-oriented environment in which a system may be implemented to provide collaborative service security and decision making in accordance with one implementation of the disclosure.

The following description is merely exemplary in nature and is not intended to limit the present disclosure, application, or uses. It should be understood that throughout the drawings, corresponding reference numerals indicate like or corresponding parts and features. The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. Further, it should be understood that unless the context clearly indicates otherwise, the term "based on" when used in the disclosure and/or the claims includes "at least partly based on", "based at least in part on", and the like.

In various implementations of the disclosure, a system provides collaborative service security and decision making, e.g., in a service-oriented architecture (SOA) environment.

Implementations can be particularly useful in a collaborative environment in which groups of software services may be requested by a plurality of software applications. Such applications may reside behind different firewalls. In various implementations, service security and service monitoring are integrated to support a collaborative decision making environment. Security and monitoring are particularly important in net-centric environments in which, e.g., each airport, plane, sea port, ship, and/or rail station can be a service agent that consumes and produces services.

A net-centric, service-oriented architecture (SOA) environment in which a collaborative service security and decision making system may be implemented in accordance with the disclosure is indicated generally in FIG. 1 by reference number 20. The environment 20 includes a plurality of network nodes 24, which may be mobile and/or stationary. Each node 24 includes a processor 28 and memory 32. Nodes 24 may also include a user interface 36. Nodes may be standalone or included on or in various types of platforms, including but not limited to buildings, ships, aircraft and other vehicles. The nodes 24 communicate, e.g., collaborate, with one another over a network 40, e.g., the Internet via one or more servers 44. A given node 24 may or may not be behind a firewall. In the collaborative environment 20, users of the nodes 24 may invoke a plurality of software applications, which may call a plurality of reusable software services available in the environment 20. Such applications and services may be distributed among the nodes 24 and may or may not reside behind firewalls.

Figure 2:
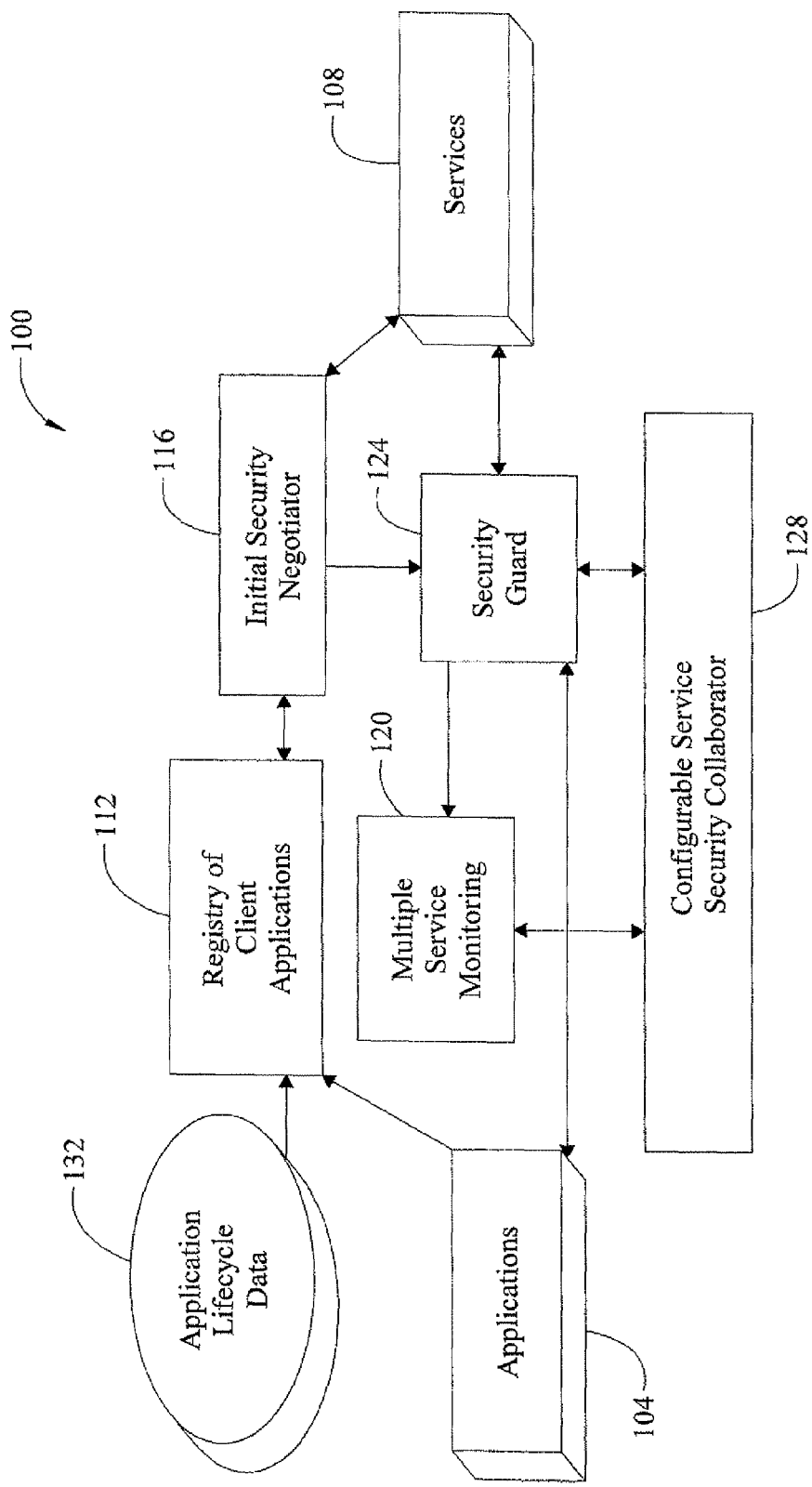
FIG. 2 is a diagram of a system providing collaborative service security and decision making in accordance with one implementation of the disclosure.

One exemplary implementation of a collaborative service security and decision making system is indicated generally in FIG. 2 by reference number 100. The system 100 provides security as to access by a plurality of applications 104 to a plurality of services 108, which may or may not be associated in groups for use by the applications 104. Each service 108 maintains its own state and communicates with applications 104 and other services via messages. Each service 108 exposes definitions of its behavior and of the messages that the service accepts and/or returns. A service 108 may receive input from and/or send output to one or more sensors in the environment 20. For example, a node 24 associated with a vehicle may use a service 108 that receives speed measurements from a vehicle speed sensor. Each speed measurement value delivered by the service 108 to the environment 20 is an event that changes a current situational state in the environment.

The system 100 includes an application registry 112, an initial security negotiator 116, a multiple service monitoring capability 120 ("service monitor"), a security guard 124, and a service security collaborator 128 ("collaborator") that is dynamically configurable as further described below. The application registry 112 is configured to maintain network addresses, e.g., IP addresses, for servers for each application 104 registered in the system 100. In such manner, unauthorized access to the system 100 may be prevented. Registration of applications 104 is user-based and substantially firewall-independent. Based on a list of expected network addresses, secure access can be provided via the application registry 112 to applications 104 even if an application is separated by a firewall from other applications 104 of the system 100. The application registry 112 also makes use of information 132 relating to lifecycles of the applications 104.

The service monitor 120 monitors services 108 invoked by applications 104. As further described below, the system 100, in providing service security and service monitoring, collects and takes into account information 132 relating to lifecycles of the applications 104. Security decisions may be made, e.g., by the security guard 124 based on such life cycle information and/or based on behaviors of and/or rules applicable to services 108 invoked by applications 104 and monitored by the service monitor 120. As further described below, data obtained through the monitoring of invoked services 108 is used to dynamically configure the collaborator 128. The collaborator 128 provides to the security guard 124 a situational state exposed by services 104 being provided in the environment 20. The security guard 124 may validate or deny an application service request based on the situational state. In one implementation, during an invocation by an application 104 of a given service 108, the collaborator 128, via the security guard 124, provides the situational state to the given service 108. The given service 108 may direct its own behavior based on the situational state. In such manner, collaborative service decision making can be performed.

Figure 3:
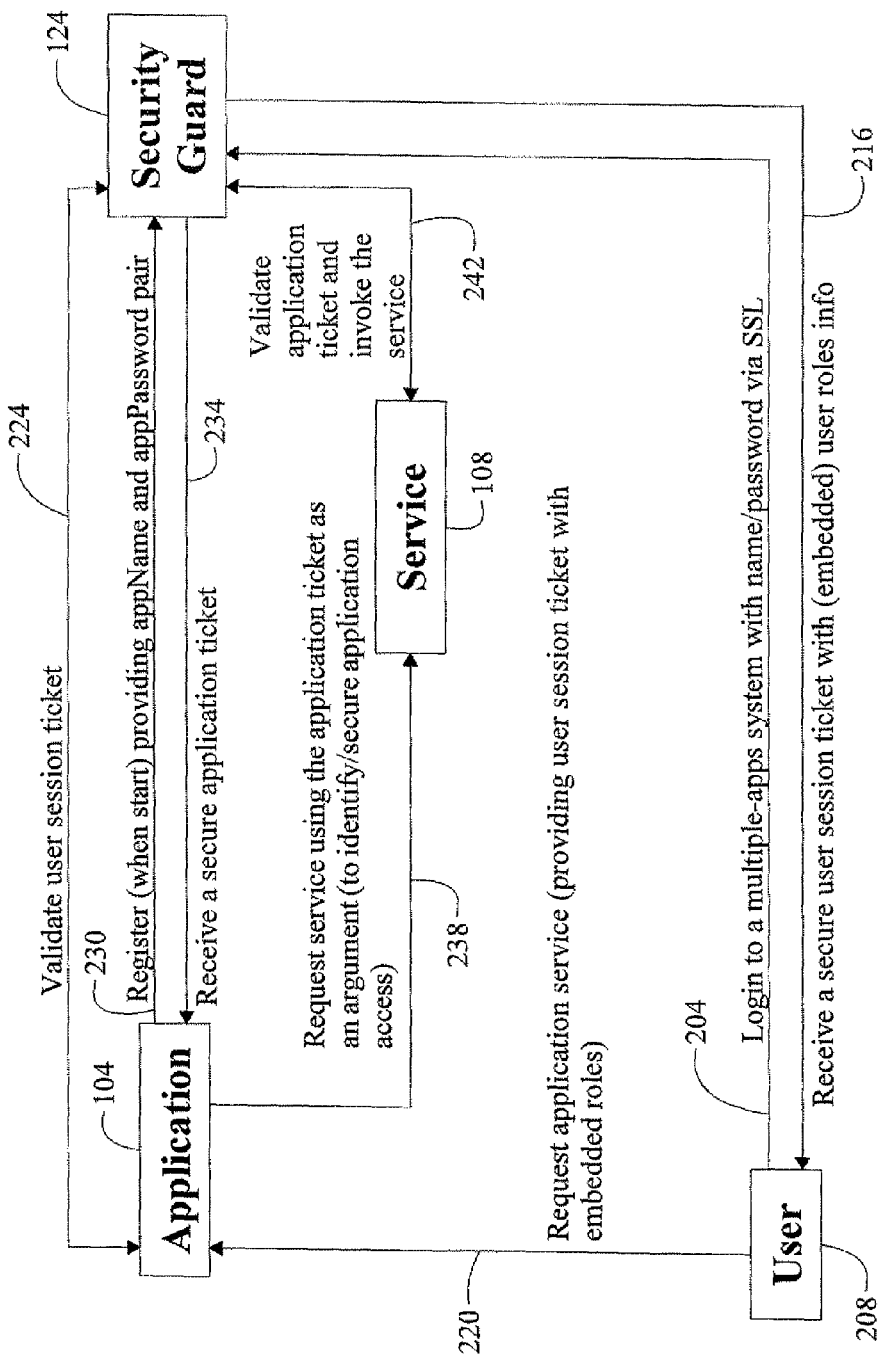
FIG. 3 is a diagram of a method of providing security as to a plurality of services usable by a plurality of applications in accordance with one implementation of the disclosure.

An exemplary method of providing security as to a plurality of services usable by a plurality of applications is indicated generally in FIG. 3 by reference number 200. The method 200 may be performed, e.g., by the system 100. It should be understood that although the following description refers to particular processes, the term "process" is used in a general sense. A process may include various sub-processes and/or may overlap in time with other processes. Further, unless otherwise indicated, processes described herein are not necessarily performed in the order in which they are described.

Referring now to FIGS. 1, 2 and 3, a user session is established, e.g., in the network 20 in the following manner. In process 204, a user 208 logs onto a collaborative system in which applications 104 are provided. The user logs on using, e.g., a user name and password via a Secure Sockets Layer (SSL) connection over the network 20. The login information is sent to the security guard 124, which verifies the identity of the user. In process 216 the security guard 124 sends a secure user session ticket to the user 208 that includes embedded user roles information.

In process 220 the user requests an application 104 configured to request one or more services 108. The user session ticket with embedded roles is provided to the requested application 104. In process 224 the requested application 104 sends the user session ticket to the security guard 124, which validates the session ticket. In process 230 the requested application 104 registers with the security guard 124, e.g., by sending an application name/password pair. In process 234 the security guard 124 creates and provides a time-stamped, encrypted application ticket to the requested application 104. In process 238 the requested application 104 requests a service 108. Inclusion of the application ticket as an argument in the request by the application 104 causes the system 100 to identify the request as one for secure access by the application 104 to the service 108. In process 242 the service 108 sends the application ticket to the security guard 124, which validates the application ticket and invokes the service 108 for the application 104. Upon every subsequent request by the application 104 for a service, the application ticket is dynamically updated and re-encrypted. In such manner, decryption of the application ticket can be prevented.

In some implementations, and referring to FIG. 2, the initial security negotiator 116 authenticates a requested application 104 and creates a time-stamped, encrypted application ticket for the application. The application ticket is dynamically updated with every service request to prevent decryption of the ticket. The negotiator 116 receives security data from the application registry 112. Security data may include, e.g., a time of initial start or scheduled restart of the application 104 and application credentials including an application code, password, and expected IP (Internet Protocol) address of the requestor. An initial request by an application 104 for a service 108 may include application credentials, which the negotiator 116 compares with application credentials obtained from the application registry 112. The negotiator 116 may also determine whether the initial service request arrived at an expected time and/or from an expected IP address on the network 20. If authentication is successful, the negotiator 116 creates and passes to the security guard 124 an encrypted security ticket with embedded credentials for the requested application 104. The security guard 124 passes the application ticket to the requesting application 104, for use by the application 104 in making subsequent service requests during the user session. Each service request from the requesting application 104 includes the ticket with embedded, encrypted time of the request. The security guard 124 checks ticket components, including application code, time of request, and whether the request arrived from an expected IP address on the network 20.

As previously mentioned with reference to FIG. 2, an application ticket is dynamically associated in the system 100 with information 132 relating to a lifecycle of the application 104. For example, the system 100 monitors times of deployment, stop and re-start (if any) of the application. Additionally, the system 100 monitors behaviors of the services 108, e.g., relative to applications 104 that may be using them. For example, the service monitor 120 may monitor the frequency of service requests, ratio of success and failure cases and related alerts, volume of data in service response, etc. The system 100 checks the application ticket timestamp and other data associated with an application ticket. If a time window associated with the ticket is not within configuration values, the system 100 may, e.g., provide an alert and/or reject access by the application to a service 108. Information relating to an application ticket is used by the system 100 so as to minimize the possibility of a security breach during initial security negotiations with an application, when the application sends its credentials. The same information may also be used to interpret service monitoring data.

Figure 4:
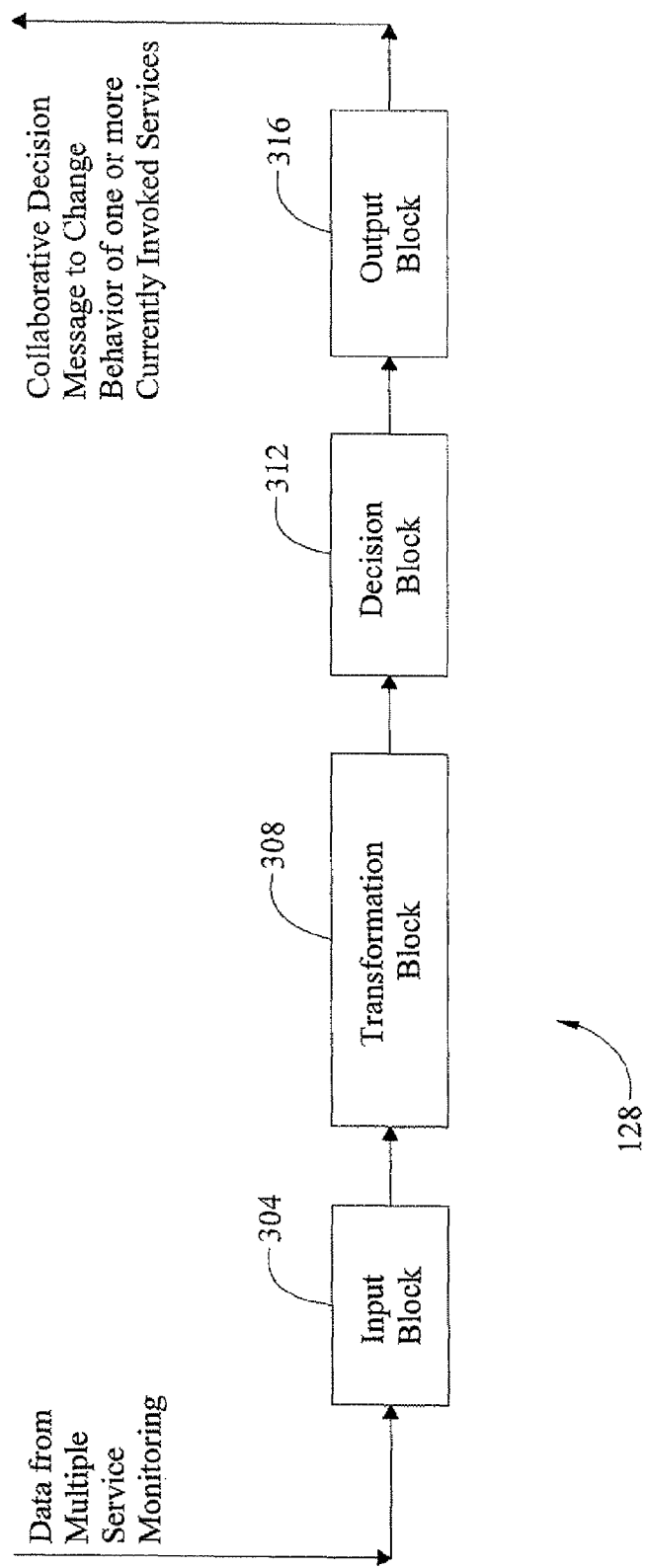
FIG. 4 is a conceptual diagram of a configurable security service collaborator in accordance with one implementation of the disclosure.
Figure 5:
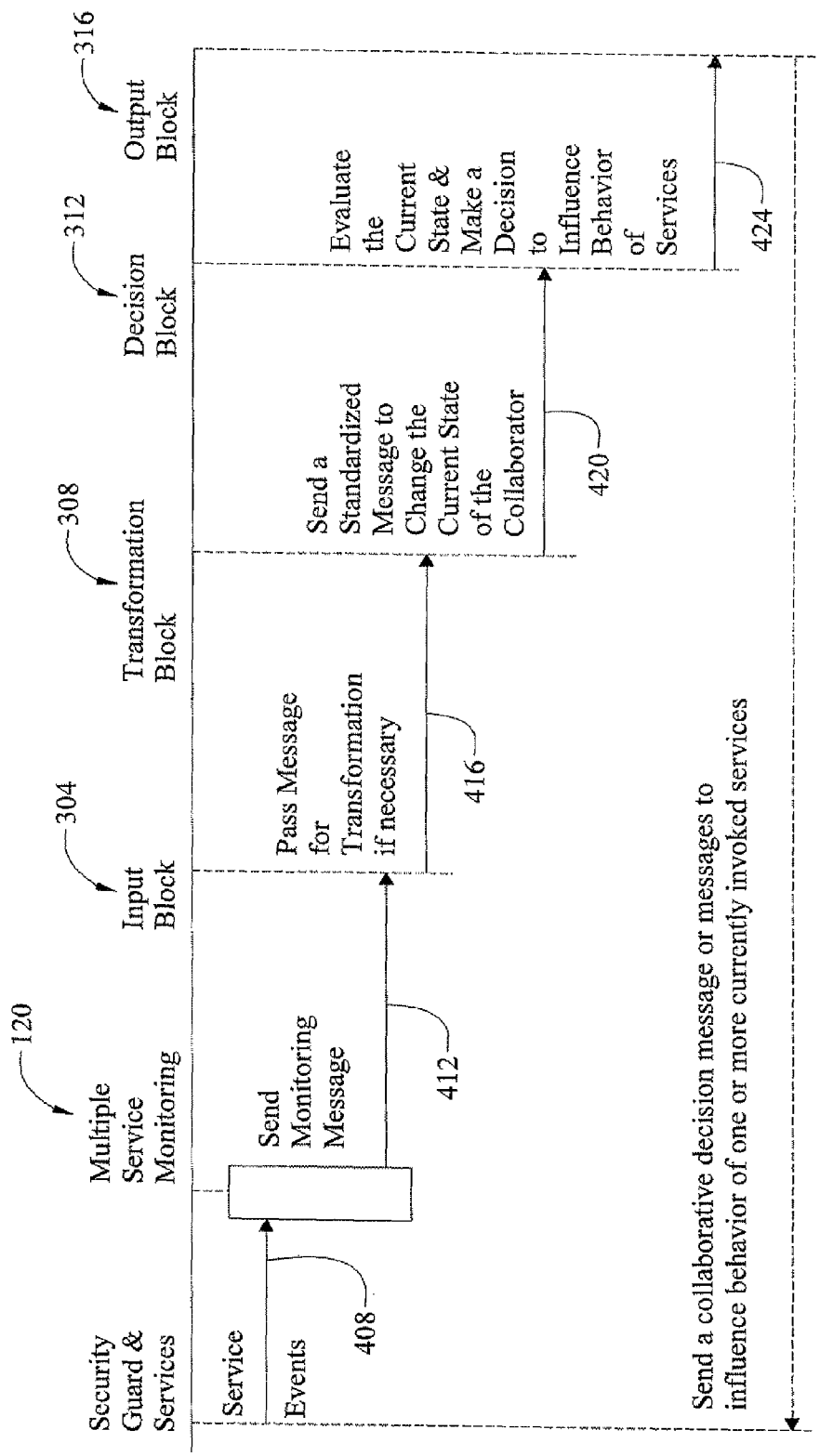
FIG. 5 is a sequence diagram of a collaborative decision making process in accordance with one implementation of the disclosure.

As previously mentioned, collaborative service security and decision making can be performed via the dynamically configurable collaborator 128. One implementation of a collaborator is shown in FIG. 4. The collaborator 128 includes an input block 304, a transformation block 308, a decision block 312 and an output block 316. A sequence diagram of collaborative decision making via the collaborator 128 is shown in FIG. 5. In process 408, the service monitor 120 intercepts an event in a service 108 being provided in the environment 20. In process 412 a monitoring message describing the service event is sent to the input block 304 of the collaborator 128. The input block 304 recognizes a type of the event and in process 416 sends the event message to an appropriate transformation apparatus of the transformation block 308. In process 420 the transformation block 308 sends an appropriately formatted message to the decision block 312. The appropriately formatted message changes a current situational state of the decision block 312.

Referring again to FIG. 5, change to the situational state initiates evaluation of the changed situational state in process 424. Evaluation of the changed situational state may result in a message or messages to influence behavior of one or more services 108 active in the environment 20. The output block 316 formats the message or messages for interpretation by service(s) 108 and provides the message(s) to services 108 via the security guard 124. One or more services 108 may modify their behavior based on the message(s). Additionally or alternatively, the security guard 124 may make security decision(s) as to one or more services 108 based on the message(s) and/or based on the changed situational state.

Figure 6:
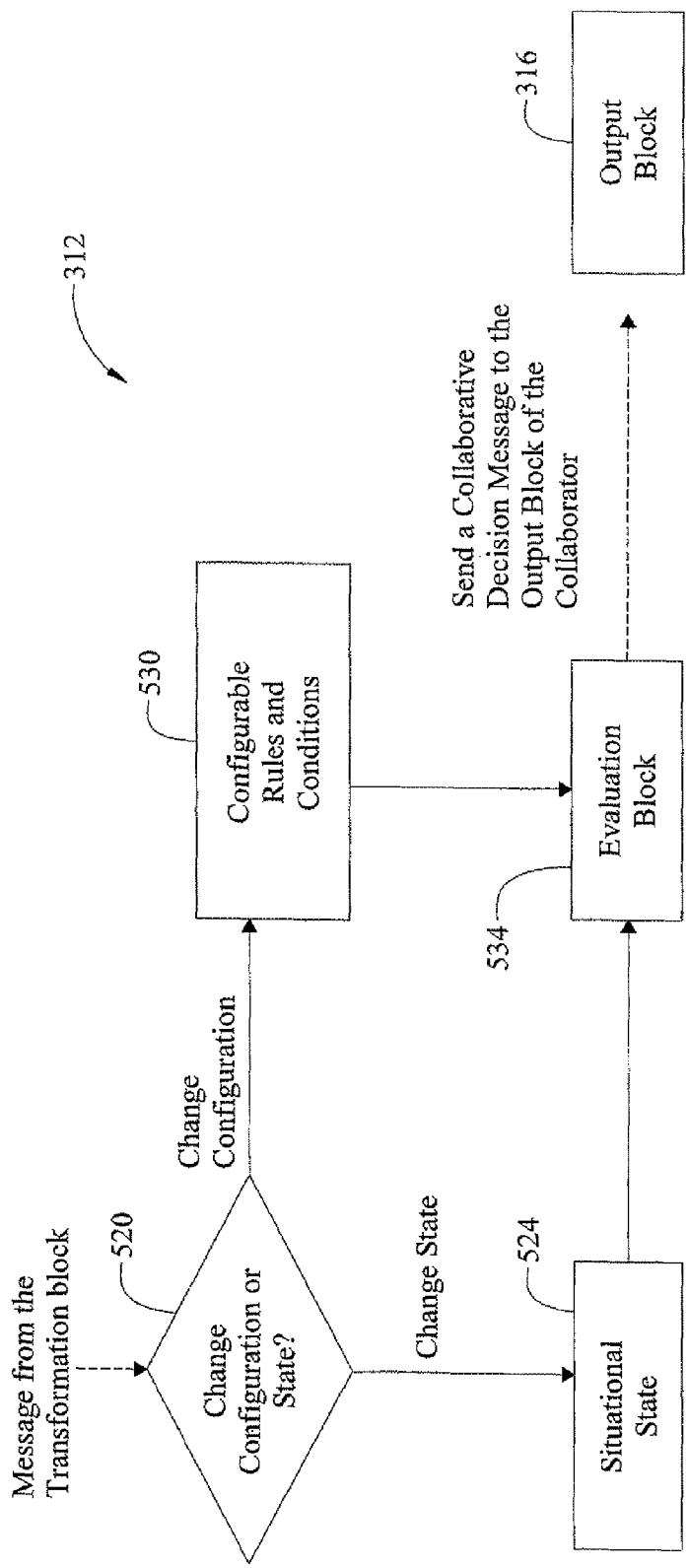
FIG. 6 is a diagram of a decision block of a configurable security service collaborator in accordance with one implementation of the disclosure.

One exemplary implementation of the decision block 312 is shown in FIG. 6. The decision block 312 includes a conditional block 520, a situational state block 524, a state of rules and conditions block 530 and an evaluation block 534. Service messages from the transformation block 308 can be of more than one type. For example, a message may relate to a service event as previously described. Additionally or alternatively, a message may be specified, e.g., to change configurable rules and conditions as further described below. The conditional block 520 recognizes this type of service message and sends it to the state of rules and conditions block 530 to dynamically re-configure one or more rules and/or conditions. If a service message relates to a service event monitored by the service monitor 120, the conditional block directs the message to the situational state block 524. In the situational state block 524 the situational state exposed by monitored services 108 is changed in accordance with the message. Thus the situational state block 524 performs in the same or similar manner as a state machine in which states are changed via messages provided by the transformation block 308.

Figure 7:
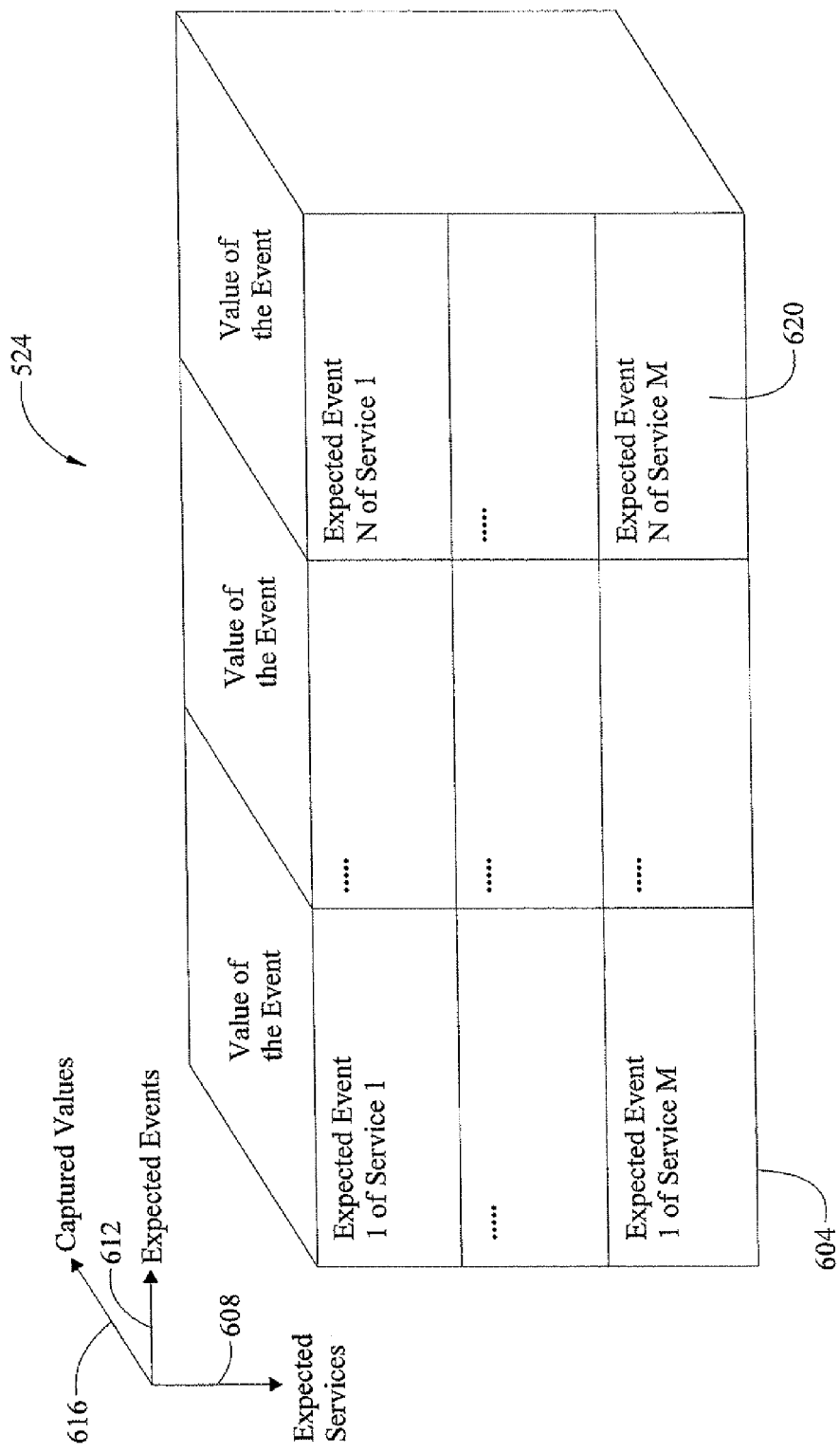
FIG. 7 is a diagram of a state of services block of a configurable security service collaborator decision block in accordance with one implementation of the disclosure.

One exemplary implementation of a situational state block 524 is shown in FIG. 7. The situational state block 524 includes a multi-dimensional, e.g., three-dimensional, memory block 604 in which service event values and/or messages are captured. One or more services 108 are represented in a dimension 608. A dimension 612 represents one or more events for the service(s) 108 represented in the dimension 608. A dimension 616 represents values and/or messages related to the service events represented in the dimension 612. The memory block 604 thus includes a plurality of cells 620, the number of which may be determined by the dimensions 608, 612 and 616. When the service monitor 120 intercepts a service event, a value or a message related to the event is captured in a cell 620.

Referring to FIGS. 5 and 6, the transformation block 308 transforms various event messages into format(s) expected in the situational state block 524, for example, XML format including a specific name of a cell 620 in the state block 524 and a value for the cell. A message that changes the state of services memory block 604 also initiates an evaluation process performed by the evaluation block 534. The evaluation block 534 performs an evaluation of the situational state exposed by services 108, e.g., against configurable rules and conditions as further described below. This evaluation may result in a message or messages to influence behavior of one or more currently invoked services 108.

Figure 8:
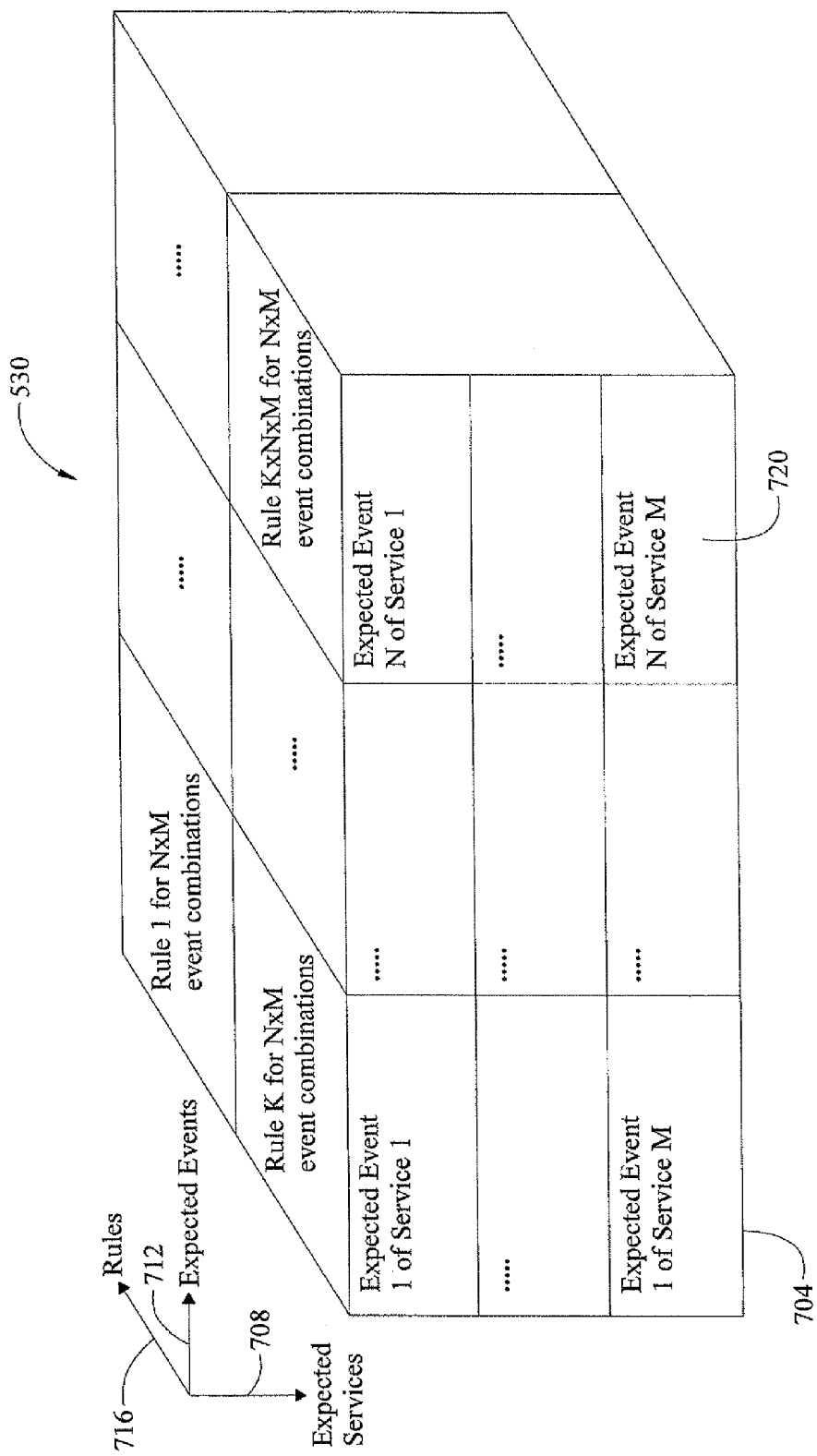
FIG. 8 is a diagram of a configurable rules and conditions block of a configurable security service collaborator decision block in accordance with one implementation of the disclosure.

One exemplary implementation of the configurable rules and conditions block 530 is shown in FIG. 8. The block 530 includes a multi-dimensional, e.g., three-dimensional, memory block 704 in which rules and conditions for one or more combinations of service events are stored. One or more services 108 are represented in a dimension 708. A dimension 712 represents one or more events for the service(s) 108 represented in the dimension 708. A dimension 716 represents rules related to the service events represented in the dimension 712. The memory block 704 thus includes a plurality of cells 720, the number of which may be determined by the dimensions 708, 712 and 716.

There could be K×N×M scenarios of various combinations of service events, where N is a maximum number of services taken into consideration, M is a maximum number of events per service taken into consideration and K is an arbitrary number of maximum combinations of event values or messages in the rules. It is not necessary for all cells 720 in the K×N×M matrix 704 to hold rules. Selected cells 720 may hold rules. Each rule may describe a combination of values and/or messages for selected events and may suggest an appropriate output message or messages for a specific service or services. Such a message, when it arrives at a targeted service 108, can influence service behavior.

Rules can be structured, for example, to provide standards for security and/or collaboration among services 108. For example, in an airport context a rule may provide that in case of (1) an event "Approaching" in an "Aircraft Control" service 108 where the value of "direction" is opposite to a direction of an event of "Taking Off" in an "Airline Operations Control" service 108, within plus or minus 10 percent leeway, and (2) a "Wind" event in a "Weather" service 108 has a direction value similar to that of the "Taking Off" event within plus or minus 10 percent leeway, then the following messages should be produced (a) the messages "Show Weather" and "Show Taking Off" to the "Aircraft Control" service 108 and (b) the message "Focus On a Specific Direction" with the value of the "direction" for the "Approaching" event in the "Airline Operations Control" service 108. In the present example, the foregoing messages serve to re-set key values of visualization and audio systems for appropriate services 108, e.g., to focus on situational keys considered to be the most important.

When prompted by a service event, the evaluation block 534 compares existing rules 704 against the current state of service behaviors 604. If one or more scenarios captured in the rules matrix 704 are matched, one or more messages are produced. If need be, as in the foregoing example, the evaluation block 534 makes appropriate calculations according to rules to validate whether a current situation should produce a message to adjust service behavior. If so, service adjustment message(s) are sent to the output block 316 of the collaborator 128, where the message or messages are formatted according to expectations of target services 108.

Figure 9:
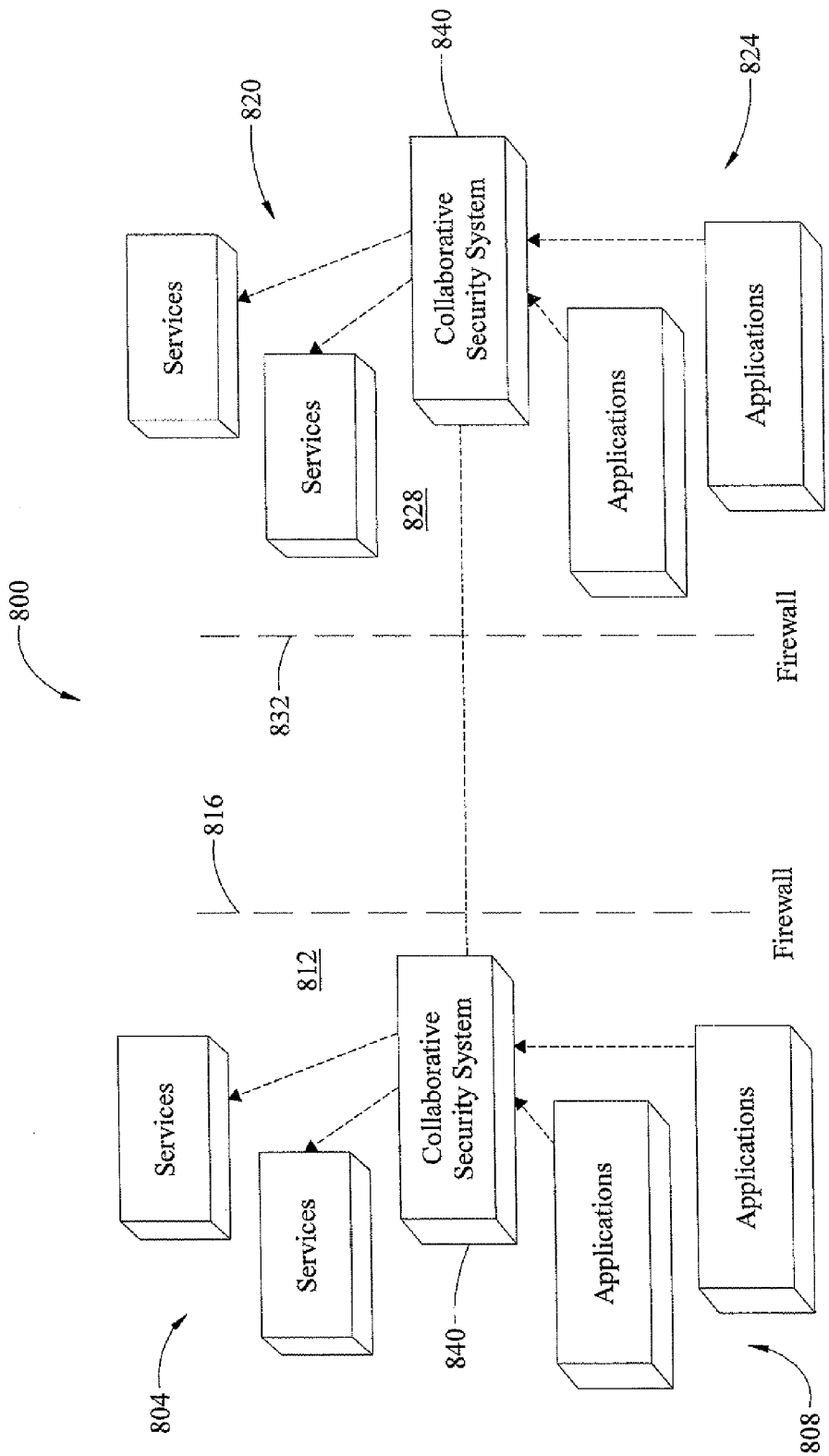
FIG. 9 is a diagram of a network environment that includes a collaborative service security and decision making system in accordance with one implementation of the disclosure.

A network environment that includes another configuration of a collaborative service security system is indicated generally in FIG. 9 by reference number 800. In the environment 800, services 804 and applications 808 are hosted in a network 812 behind a firewall 816. Services 820 and applications 824 are hosted in a network 828 behind a firewall 832. In each network 812 and 828, an instance 840 of a collaborative service security system is deployed in accordance with one implementation of the disclosure. The instances 840 communicate and collaborate with each other through and substantially independent of the firewalls 816 and 832. Where an instance 840 is deployed on behalf of client applications, it is capable of distinguishing network addresses listed as servers for applications 808 and/or 824. Thus, access by illegitimate computers can be intercepted.

Various implementations of the foregoing systems and methods can provide a plurality of security layers in collaborative environments. Service security and service monitoring for multiple service groups can be deployed within different firewalls to enable secure service collaboration and a secure collaborative decision making environment.

Possibilities of security breach can be reduced through the foregoing use of time windows for service initial negotiations and service requests. In various implementations, authentication of application-requestors takes place only during security negotiations when an application starts (or re-starts). All other requests are validated through the use of dynamically updated application tickets based on initial negotiations. Accordingly, fewer items of authentication information need to be passed with every service request. Secure access by applications can be provided based on a list of expected network addresses, even where client applications reside within another firewall. Costs associated with certification keys, and costs associated with generic security gateway servers, can be reduced or eliminated. Current service security standards and solutions are oriented toward protecting single services. In contrast, various systems and methods in accordance with the disclosure can take into account the collaborative nature of many service transactions with service dependencies. The foregoing systems and methods make use of service monitoring data to provide security and standards for collaborative decision making environments. Various implementations of the disclosure can be used to protect not just a single service, but a plurality of services used in a collaborative environment.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of providing collaborative security and collaborative decision making in a service-oriented architecture environment, the method comprising:

validating one or more requests by one or more of a plurality of applications for provision of one or more of a plurality of services in the service-oriented architecture environment, the applications and services residing on and distributed among a plurality of nodes in the environment, each service maintaining its own state and capable of communicating with the applications and the other services via messages;

providing each service for which an application request is validated;

monitoring behaviors of each provided service in relation to use by the applications, the monitoring performed to detect events that change a combined situational state exposed by the services when being provided in the environment;

comparing the changed combined situational state with a set of scenarios of various combinations of service events for each service, wherein the set of scenarios is formed from a three dimensional memory matrix such that at least a subplurality of the set of scenarios each have:
  a specific combination of service events;
  a rule set which is associated with the specific combination of service events; and
  an expected service that is associated with the specific combination of service events; and
the comparing is performed to find a match in the scenarios with the changed combined situational state;

based on the match, evaluating the changed combined situational state relative to the set applicable to the set of scenarios, the rule set dynamically changeable in response to one or more events detected by the monitoring; and dynamically influencing the validating of one or more service requests by sending a message to one or more of the services in regard to the changed combined situational state;

the method performed by a system having a plurality of processors and memory.

2. The method of claim 1, further comprising, based on the evaluated combined situational state, dynamically changing one or more of the rules applicable to the services.

3. The method of claim 1, further comprising, based on the evaluated combined situational state, dynamically influencing behavior of one or more of the services currently being provided.

4. The method of claim 3, wherein influencing behavior of one or more of the services comprises at least one of the following:
sending one or more messages to one or more of the services being provided; and
changing one or more rules of the rule set applicable to the services being provided.

5. The method of claim 1, wherein validating a request for a service comprises re-encrypting an encrypted ticket issued to the application requesting the service.

6. The method of claim 1, further comprising:
intercepting an event in one of the provided services; and
evaluating the event in accordance with one or more rules applicable to the provided services.

7. The method of claim 1, further comprising:
monitoring a lifecycle of an application requesting a given service; and
based on the lifecycle, validating or denying the request for the given service.

8. The method of claim 1, wherein validating a request for a service comprises determining whether the request arrived from an expected network address.

9. A method of providing collaborative security and decision making in a service-oriented architecture (SOA) environment, the method comprising:
issuing an application ticket to an application invoked by a user of the SOA environment, the environment including a plurality of applications and services residing on and distributed among a plurality of nodes in the environment, each service maintaining its own state and capable of communicating with the applications and the other services via messages;
in response to a request by the invoked application for one of the services, validating the application ticket and providing the requested service to the invoked application;
monitoring service events that change a combined situational state exposed by the provided service and by other services being provided in the environment;
comparing the changed combined situational state with a set of scenarios of various combinations of service events for each service;
the set of scenarios being formed from a three dimensional memory matrix such that at least a subplurality of the set of scenarios each have:
a specific combination of service events;
a rule set which is associated with the specific combination of service events; and
an expected service that is associated with the specific combination of service events; and
based on the match, evaluating the current combined situational state relative to a rule set applicable to the set of scenarios, the rule set dynamically changeable in response to one or more events detected by the monitoring; and
updating the application ticket in response to another service request by the invoked application, the updating performed based at least in part on a lifecycle of the invoked application;
the method performed by at least one instance of a collaborative security and decision making system.

10. The method of claim 9, further comprising monitoring one or more lifecycle events to determine the lifecycle of the invoked application and monitoring a plurality of service behaviors.

11. The method of claim 10, wherein the one or more lifecycle events include one or more of the following:
a time of deployment, a stop time, and a restart time
and wherein the plurality of service behaviors includes one or more of the following:
frequency of service request, a ratio of success and failure cases and related alerts, and volume of data in a service response.

12. The method of claim 9, further comprising:
comparing a network address of the invoked application to an expected address for the application; and
performing the updating based at least in part on the comparing.

13. The method of claim 9, wherein issuing the application ticket comprises encrypting the application ticket, and validating the application ticket comprises re-encrypting the application ticket.

14. The method of claim 9, further comprising:
intercepting and evaluating events in the provided services and based on the evaluating, influencing behavior of one or more of the services being provided.

15. A system for providing collaborative security and decision making in connection with a plurality of services for a plurality of applications, the system comprising at least one processor and memory configured to:
validate one or more requests by one or more of a plurality of applications for provision of one or more of a plurality of services in a service-oriented architecture (SOA) environment, the applications and services residing on and distributed among a plurality of nodes in the environment, each service maintaining its own state and capable of communicating with the applications and the other services via messages;
provide each service for which an application request is validated;
monitor behaviors of each provided service in relation to use by the applications, the monitoring performed to detect events that change a combined situational state exposed by the services when being provided in the environment;
compare the changed combined situational state with a set of scenarios of various combinations of service events for each service and among the services;
the set of scenarios being formed from a three dimensional memory matrix such that at least a subplurality of the set of scenarios each have:
a specific combination of service events;
a rule set which is associated with the specific combination of service events; and
an expected service that is associated with the specific combination of service events; and
based on the match, evaluate the changed combined situational state relative to a rule set applicable to the set of scenarios, the rule set dynamically changeable in response to one or more events detected by the monitoring; and
dynamically influence the validating of one or more service requests by sending a message to one or more of the services in regard to the changed combined situational state.

16. The system of claim 15, comprising a plurality of processors and memories including a first instance of the system separated from a second instance of the system by one or more firewalls, the instances configured to collaborate with each other substantially independent of the one or more firewalls.

17. The system of claim 15, further comprising an application registry, the at least one processor and memory configured to update the application ticket based on a server address for the application, the address stored in the application registry.

18. The system of claim 15, wherein the at least one processor and memory are configured to, based on the evaluated combined situational state, dynamically influence behavior of one or more of the services being provided.

19. The system of claim 15, wherein the at least one processor and memory are configured to:
   monitor a lifecycle of an application requesting a given service; and
   based on the lifecycle, validate or deny the request for the given service.

20. The system of claim 15, wherein the at least one processor and memory are further configured to:
   intercept and evaluate an event in one of the provided services; and
   based on the evaluating, change one or more rules applicable to the services.

* * * * *